(12) United States Patent
Linnell et al.

(10) Patent No.: US 9,833,907 B1
(45) Date of Patent: Dec. 5, 2017

(54) PROXIMITY-BASED BINDING

(71) Applicant: X Development LLC, Mountain View, CA (US)

(72) Inventors: Jeffrey Linnell, San Francisco, CA (US); Anthony Sean Jules, Oakland, CA (US)

(73) Assignee: X Development LLC, Mountain View, CA (US)

( * ) Notice: Subject to any disclaimer, the term of this patent is extended or adjusted under 35 U.S.C. 154(b) by 158 days.

(21) Appl. No.: 14/746,392

(22) Filed: Jun. 22, 2015

(51) Int. Cl.
*B25J 13/00* (2006.01)
*B25J 13/06* (2006.01)

(52) U.S. Cl.
CPC ... *B25J 13/065* (2013.01); *G05B 2219/35438* (2013.01)

(58) Field of Classification Search
CPC .... G08C 17/00; G08C 17/02; G08C 2201/71; G08C 2201/91; G08C 2201/92; G08C 2201/93; G08C 2201/32; G08C 23/04; G06F 3/0346; G06F 3/0383; G06F 3/017; B25J 9/1689; B25J 13/006; B25J 13/0086; B25J 13/08; B25J 13/065
See application file for complete search history.

(56) References Cited

U.S. PATENT DOCUMENTS

| | | | |
|---|---|---|---|
| 5,004,391 A | 4/1991 | Burdea | |
| 5,587,937 A | 12/1996 | Massie et al. | |
| 6,189,032 B1 | 2/2001 | Susaki | |
| 6,232,735 B1 | 5/2001 | Baba | |
| 6,833,846 B2 | 12/2004 | Hasser | |
| 7,010,369 B2 | 3/2006 | Borders et al. | |
| 7,298,385 B2 | 11/2007 | Kazi et al. | |
| 8,531,392 B2 | 9/2013 | Branton | |
| 8,694,162 B2 | 4/2014 | Jaynes | |
| 8,639,386 B2 | 6/2014 | Summer et al. | |

(Continued)

FOREIGN PATENT DOCUMENTS

| | | | |
|---|---|---|---|
| JP | 2005068935 A | 3/2005 | |
| WO | 2014127822 A1 | 8/2014 | |

OTHER PUBLICATIONS

Pending U.S. Appl. No. 14/561,850, filed Dec. 5, 2014.

(Continued)

*Primary Examiner* — Adam Mott
(74) *Attorney, Agent, or Firm* — McDonnell Boehnen Hulbert & Berghoff LLP

(57) ABSTRACT

Example implementations may relate to a computing device configured to operate a robotic system. In particular, the device receives input data that is generated by a hand-holdable controller including a knob, where the knob includes touch sensors arranged to detect touch on surfaces of the knob. Based on the input data, the device detects that the controller is within a first threshold distance from a first component of the robotic system and responsively operates the first component of the robotic system based on the input data. The device then receives subsequent input data that is generated by the controller. Based on the subsequent input data, the device subsequently detects that the controller is within a second threshold distance from a second component of the robotic system and responsively operates the second component of the robotic system based on the subsequent input data.

20 Claims, 15 Drawing Sheets

(56) References Cited

U.S. PATENT DOCUMENTS

| | | | |
|---|---|---|---|
| 8,823,645 B2* | 9/2014 | Kryze | G06F 1/266 345/156 |
| 9,069,396 B2 | 6/2015 | Adler | |
| 2002/0036622 A1 | 3/2002 | Jaeger | |
| 2002/0120362 A1 | 8/2002 | Lathan | |
| 2004/0218065 A1* | 11/2004 | Schinner | H04N 1/32122 348/231.6 |
| 2004/0257339 A1 | 12/2004 | Takahashi | |
| 2005/0240309 A1 | 10/2005 | Bischoff | |
| 2007/0236450 A1 | 10/2007 | Colgate | |
| 2008/0198034 A1* | 8/2008 | Nakano | G08C 17/02 340/4.33 |
| 2009/0009491 A1 | 1/2009 | Grivna | |
| 2011/0160745 A1* | 6/2011 | Fielding | A61B 19/2203 606/130 |
| 2012/0095619 A1 | 4/2012 | Pack et al. | |
| 2012/0239194 A1* | 9/2012 | Kagawa | B25J 9/1692 700/254 |
| 2012/0316676 A1 | 12/2012 | Fouillade | |
| 2014/0188435 A1 | 7/2014 | Coombs | |
| 2014/0214239 A1 | 7/2014 | Bruck et al. | |
| 2016/0089212 A1 | 3/2016 | Balicki et al. | |

OTHER PUBLICATIONS

Launch of Kickstarter Campaign, https://www.kickstarter.com/projects/spinremote/spin-remote-the-simplest-most-personal-remote-ever/descripton, Dec. 2014.

Badescu, Mircea; Wampler, Charles; Mavroidis, Constantino; "Rotary Haptic Knob for Vehicular Instrument Controls"; Proceedings of the 10th Symp. on Haptic Interfaces for Virtual Envir. & Teleoperator Systs. (HAPTICS'02); 2002; IEEE.

Kickstarter, "SPIN remote—The Simplest, most Stylish remote ever", Dec. 2, 2014, <https://www.kickstarter.com/projects/spinremote/spin-remote-the-simplest-most-personal-remote-ever>.

* cited by examiner

PROXIMITY-BASED BINDING

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to a computing device that receives input data from a hand-holdable controller including a knob and touch sensors coupled to the knob. Based on the input data, the computing device may determine proximity of the hand-holdable controller to a particular component of a robotic system and can interpret the input data to determine intended operation of the particular component. The computing device can then send a command to the robotic system to cause the intended operation of the particular component.

In one aspect, a method is provided. The method involves receiving, by a computing device configured to operate a robotic system, input data that is generated by a hand-holdable controller, where the hand-holdable controller includes a rotatable knob, and where the rotatable knob includes one or more touch sensors arranged to detect touch on one or more surfaces of the rotatable knob. The method also involves, based on the input data, detecting, by the computing device, that the hand-holdable controller is within at least a first threshold distance from a first component of the robotic system and responsively operating at least the first component of the robotic system based on the input data generated by the hand-holdable controller. The method additionally involves receiving, by the computing device, subsequent input data that is generated by the hand-holdable controller. The method further involves, based on the subsequent input data, subsequently detecting, by the computing device, that the hand-holdable controller is within at least a second threshold distance from a second component of the robotic system and responsively operating at least the second component of the robotic system based on the subsequent input data generated by the hand-holdable controller.

In another aspect, a non-transitory computer readable medium is provided. The non-transitory computer readable medium has stored therein instructions executable by one or more processors to cause a computing system (configured to operate a robotic system) to perform functions. The functions include receiving input data that is generated by a hand-holdable controller, where the hand-holdable controller includes a rotatable knob, and where the rotatable knob includes one or more touch sensors arranged to detect touch on one or more surfaces of the rotatable knob. The functions also include, based on the input data, detecting that the hand-holdable controller is within at least a first threshold distance from a first component of the robotic system and responsively operating at least the first component of the robotic system based on the input data generated by the hand-holdable controller. The functions additionally include receiving subsequent input data that is generated by the hand-holdable controller. The functions further include, based on the subsequent input data, subsequently detecting that the hand-holdable controller is within at least a second threshold distance from a second component of the robotic system and responsively operating at least the second component of the robotic system based on the subsequent input data generated by the hand-holdable controller.

In yet another aspect, a hand-holdable-controller system is provided. The hand-holdable-controller system includes a rotatable knob. The hand-holdable-controller system also includes at least one motor that is operable to affect rotation of the rotatable knob. The hand-holdable-controller system additionally includes one or more touch sensors arranged to detect touch on one or more surfaces of the rotatable knob. The hand-holdable-controller system further includes one or more processors. The hand-holdable-controller system yet further includes a non-transitory computer readable medium. The hand-holdable-controller system yet further includes program instructions stored on the non-transitory computer readable medium and executable by the one or more processors to detect that the hand-holdable-controller system is within at least a first threshold distance from a first component of the robotic device and responsively configure the hand-holdable-controller system to operate at least the first component of the robotic system. The program instructions are also executable to subsequently detect that the hand-holdable-controller system is within at least a second threshold distance from a second component of the robotic device and responsively configure the hand-holdable-controller system to operate at least the second component of the robotic system.

In yet another aspect, a system is provided. The system may include means for receiving input data that is generated by a hand-holdable controller, where the hand-holdable controller includes a rotatable knob, and where the rotatable knob includes one or more touch sensors arranged to detect touch on one or more surfaces of the rotatable knob. The system may also include means for, based on the input data, detecting that the hand-holdable controller is within at least a first threshold distance from a first component of a robotic system and responsively operating at least the first component of the robotic system based on the input data generated by the hand-holdable controller. The system may additionally include means for receiving subsequent input data that is generated by the hand-holdable controller. The system may further include means for, based on the subsequent input data, subsequently detecting that the hand-holdable controller is within at least a second threshold distance from a second component of the robotic system and responsively operating at least the second component of the robotic system based on the subsequent input data generated by the hand-holdable controller.

These as well as other aspects, advantages, and alternatives will become apparent to those of ordinary skill in the art by reading the following detailed description, with reference where appropriate to the accompanying drawings.

DETAILED DESCRIPTION

Figure 1A:
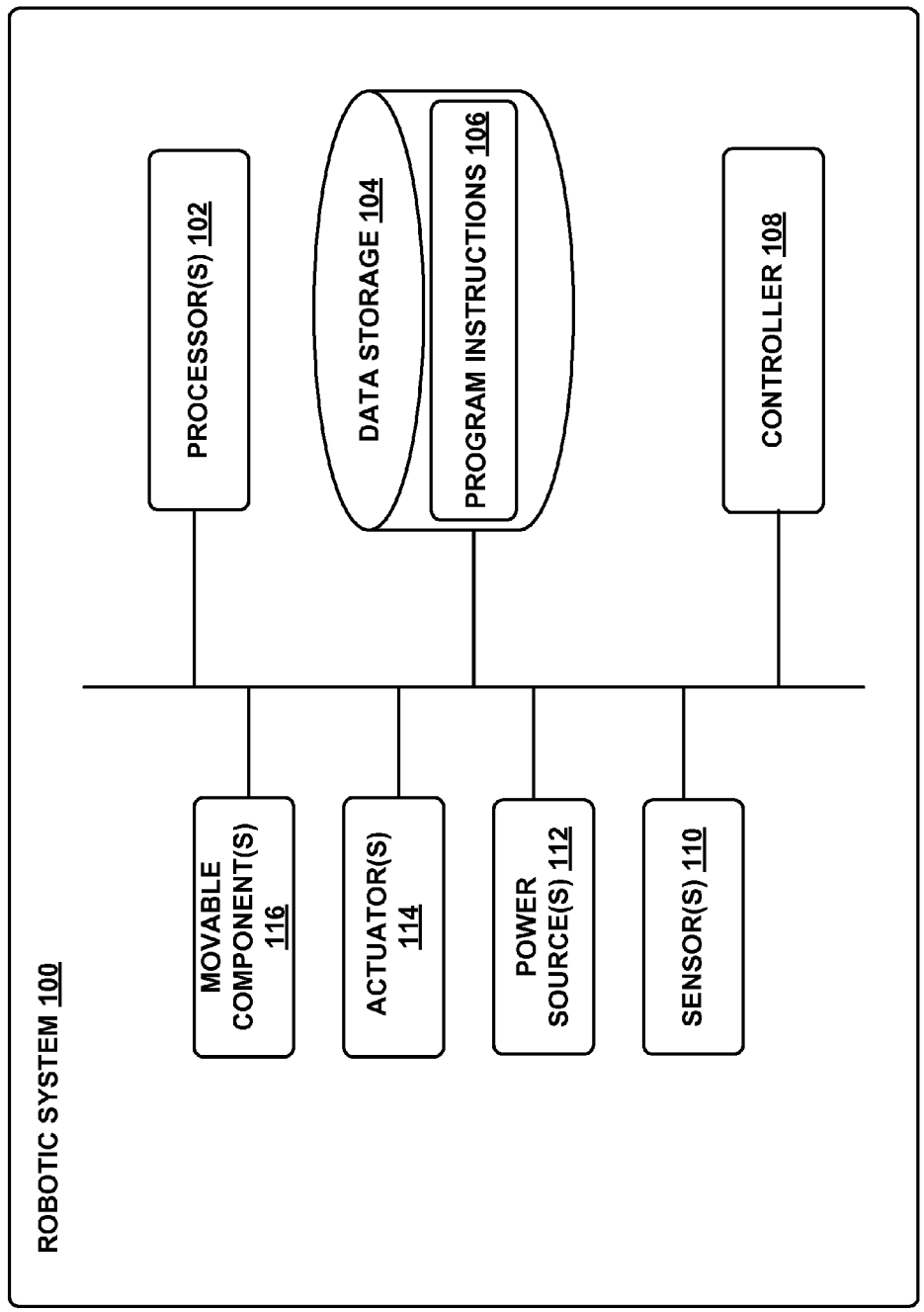
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various implementations, described herein are methods and systems for control of a robotic system. In particular, disclosed is a hand-holdable controller that includes a knob as well as touch sensors coupled to the rotatable knob. Rotation of knob and touch data received from the touch sensors may collectively generate input data that represents intended control actions provided by a user holding the hand-holdable controller. Further, a motor may be configured to apply torque to the knob, so as to provide haptic feedback.

A computing device, such as a tablet, may receive input data from the hand-holdable controller and may interpret the input data to determine specific intended operations of a robotic system. Upon processing the input data to determine a particular interpretation, the computing device may send commands to the robotic system in order to cause the robotic system to carry out intended operations of various components such as actuators coupled to joints, end effectors, appendages, speakers, and/or light sources, among others.

Moreover, in an example embodiment, selection of a particular component is based on proximity of the hand-holdable controller to the particular component. With this arrangement, a user may position the hand-holdable controller in the vicinity of an intended component. Once the hand-holdable controller is in the vicinity of an intended component, the user may use the controller to control the component via rotation the knob (possibly varying the resulting functionality based on the particular type of grip on the knob), and/or via touch gestures on one or more surfaces of the knob, among other possibilities. The computing device may receive input data that represents the user's interactions with the hand-holdable controller and may interpret the input data to provide for intended control of the intended component. Given this design of the hand-holdable controller as well as the capability of the computing device to provide extensive resources for operation of the robotic system based on data received from the hand-holdable controller, the arrangements disclosed herein provide for a simple and intuitive control of various components of the robotic system.

II. Examples Systems for Control of Robotic Devices

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
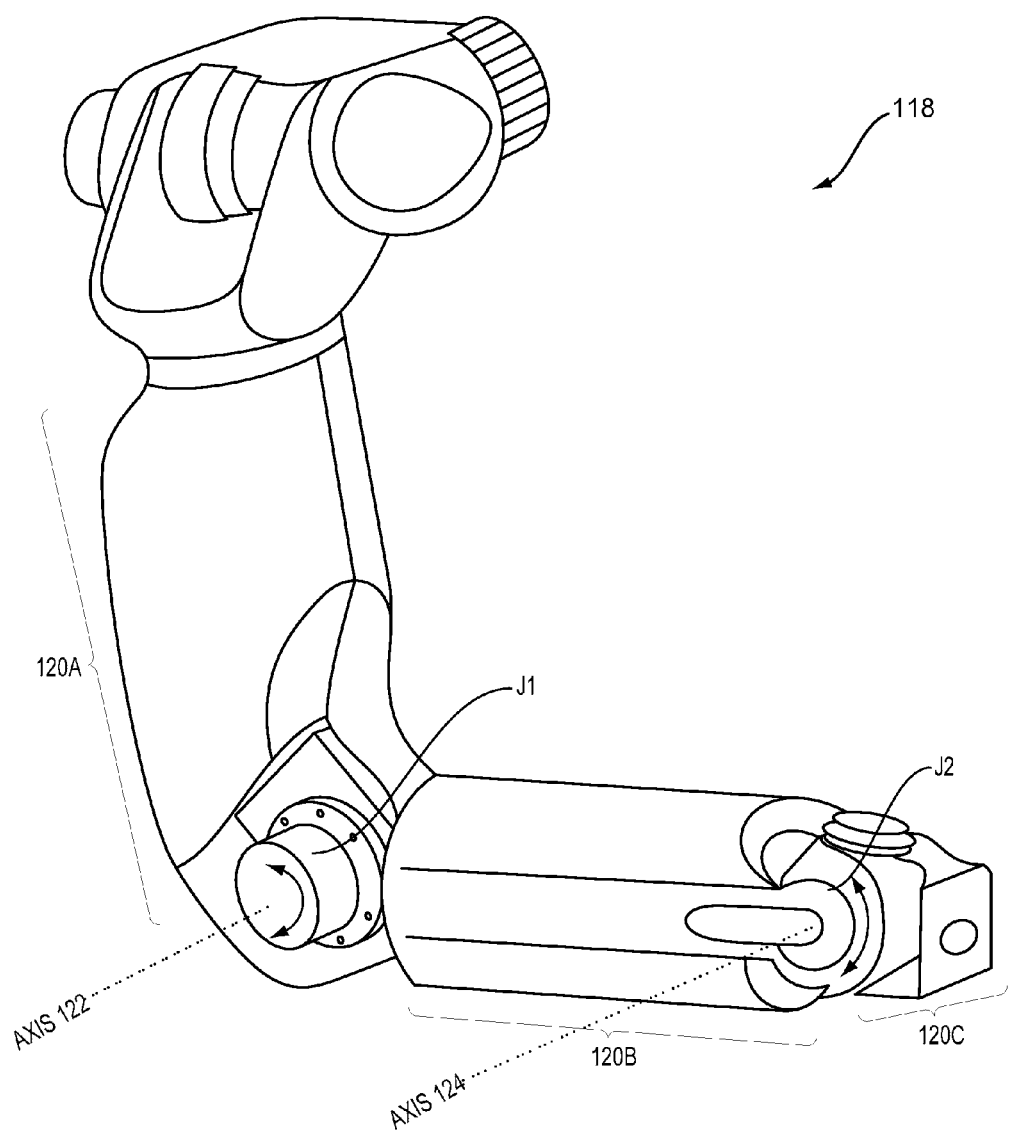

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
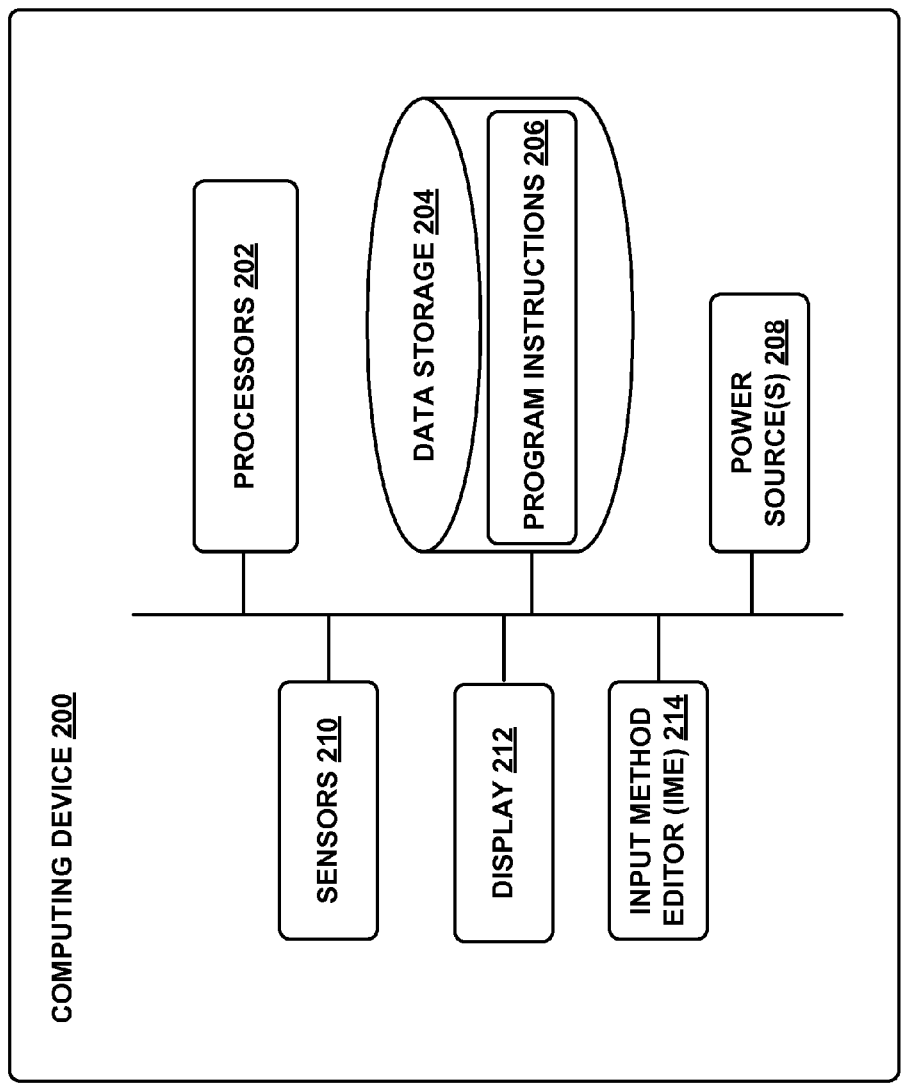
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
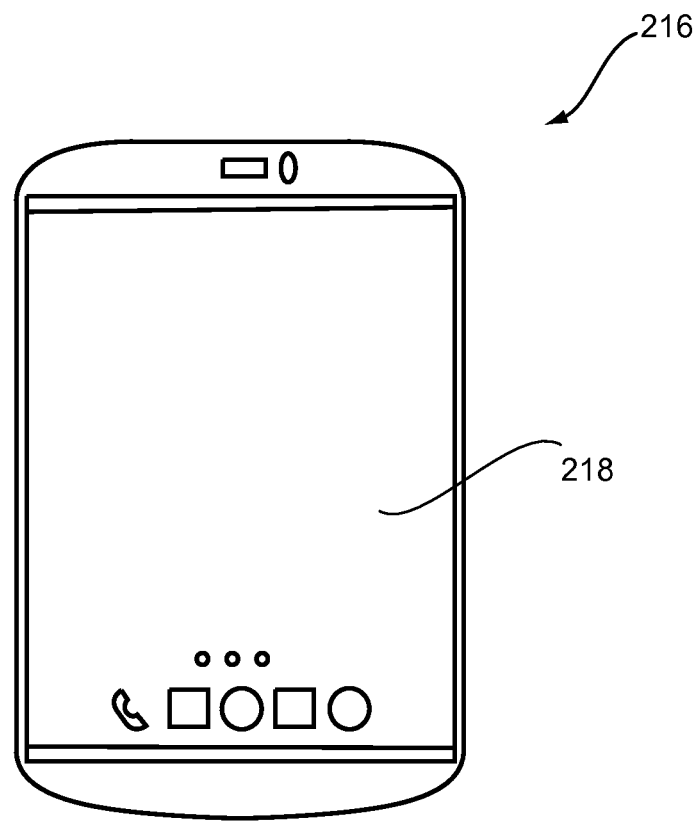

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
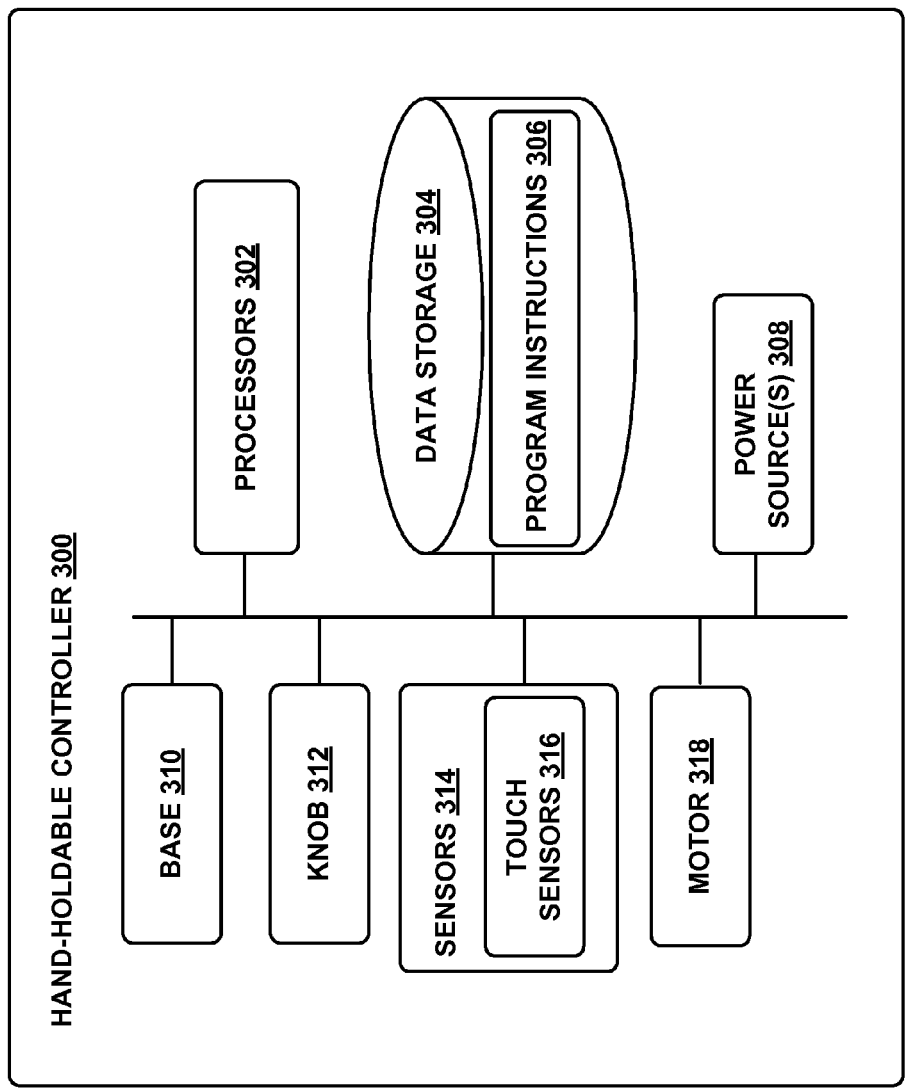
FIGS. 3A, 3B, 3C, and 3D illustrate an example hand-holdable controller, according to an example implementation.
Figure 3B:
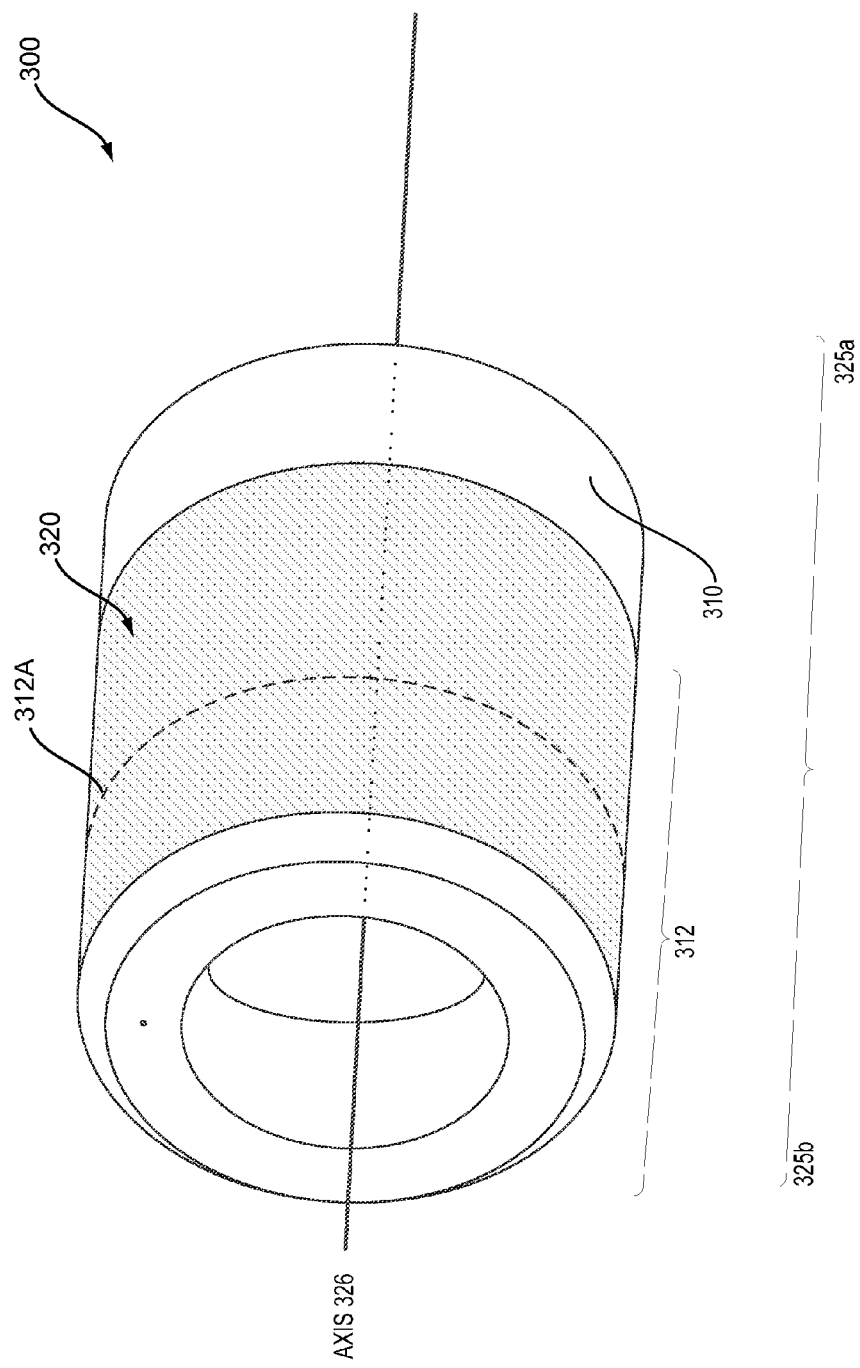

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply torque to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
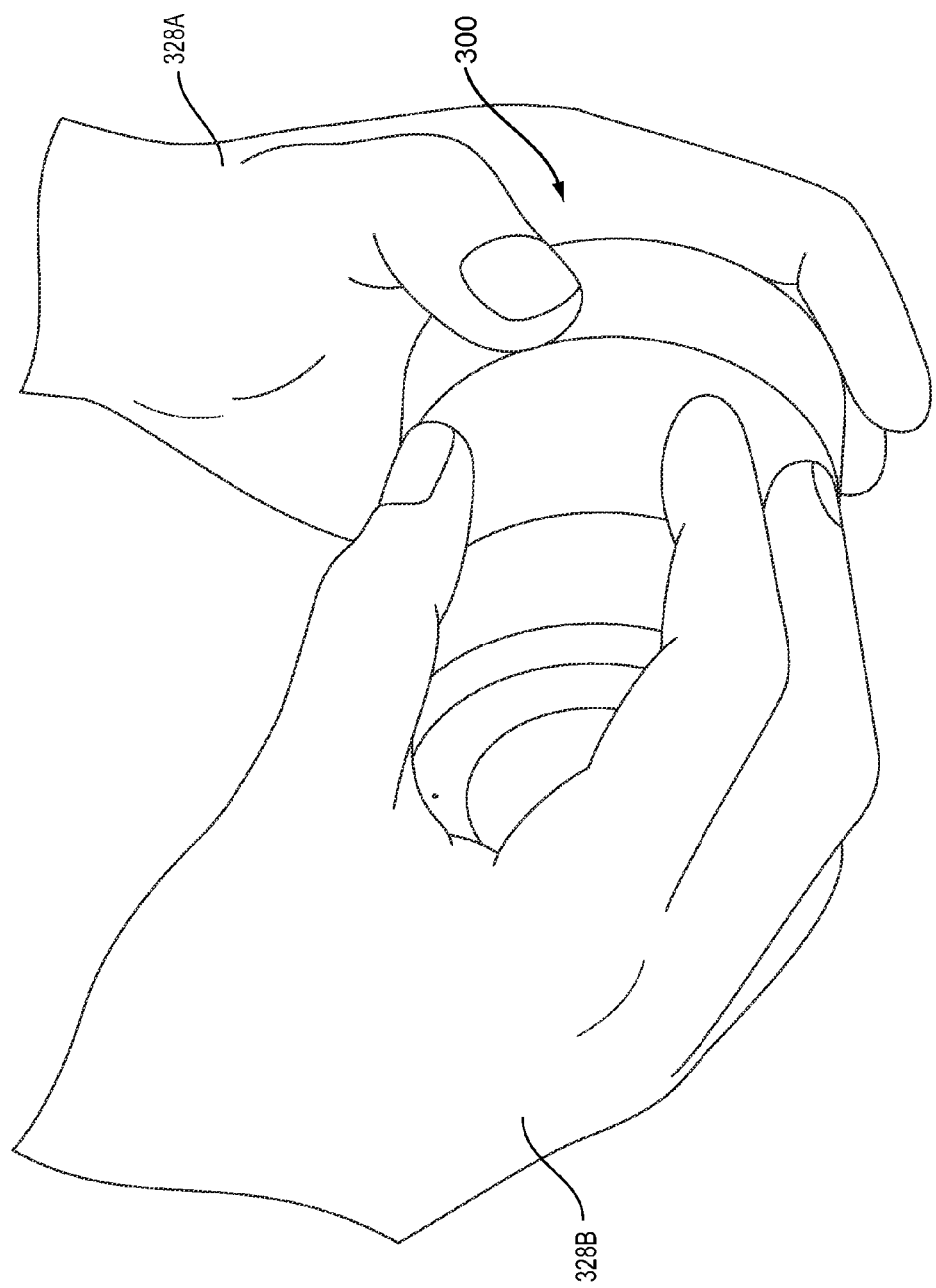

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
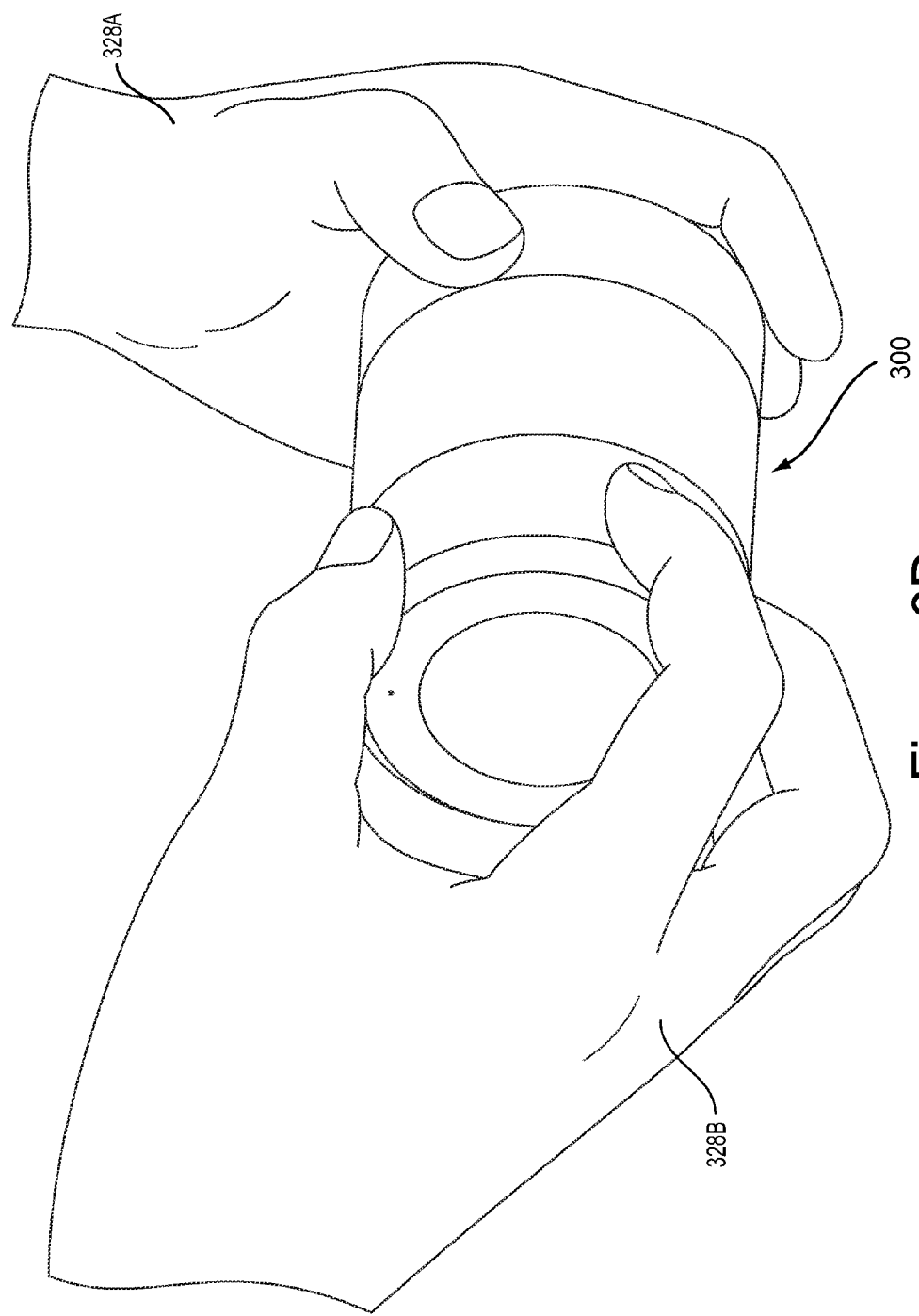

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger refraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
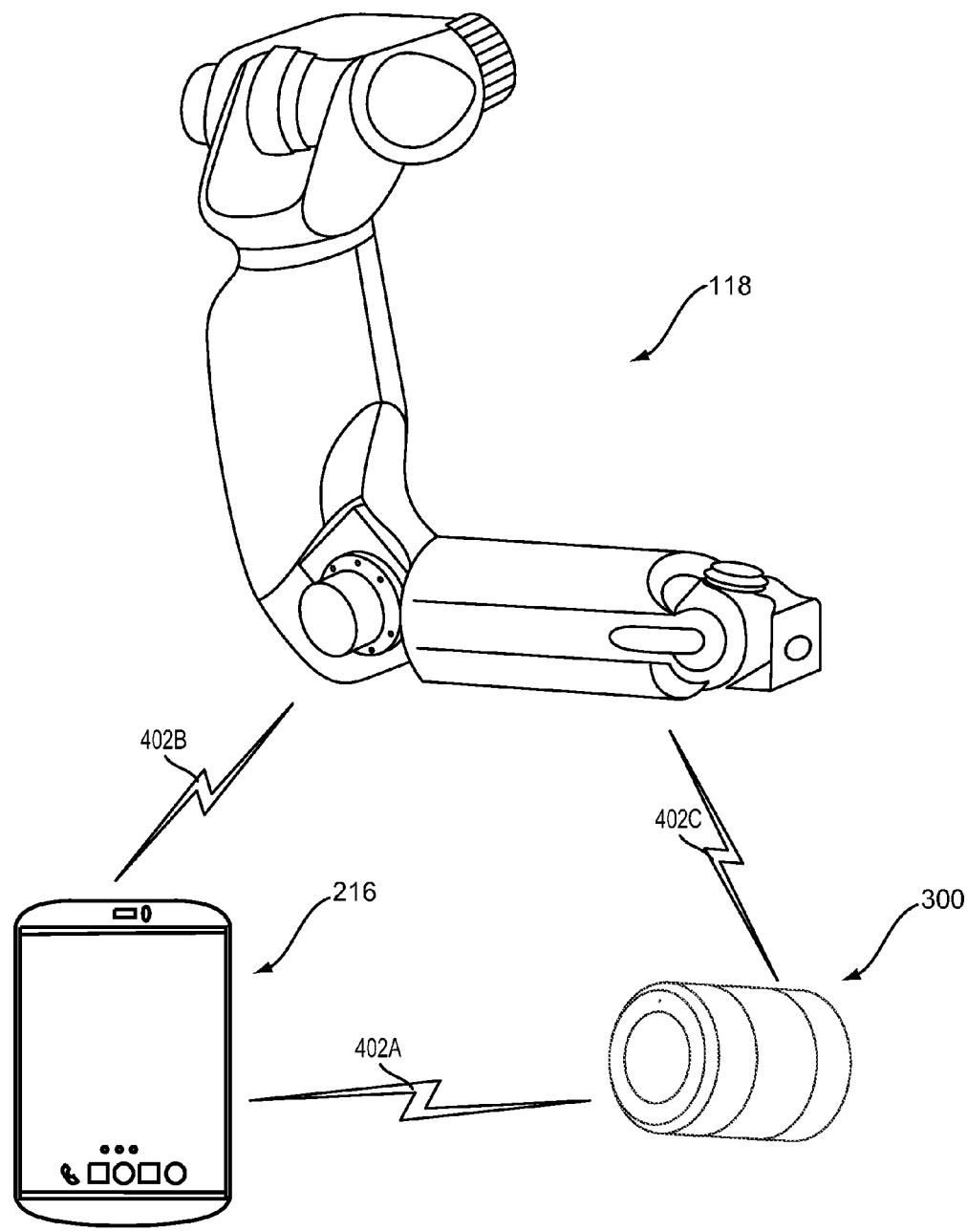
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some embodiments, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementation s, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

III. Illustrative Methods

Figure 5:
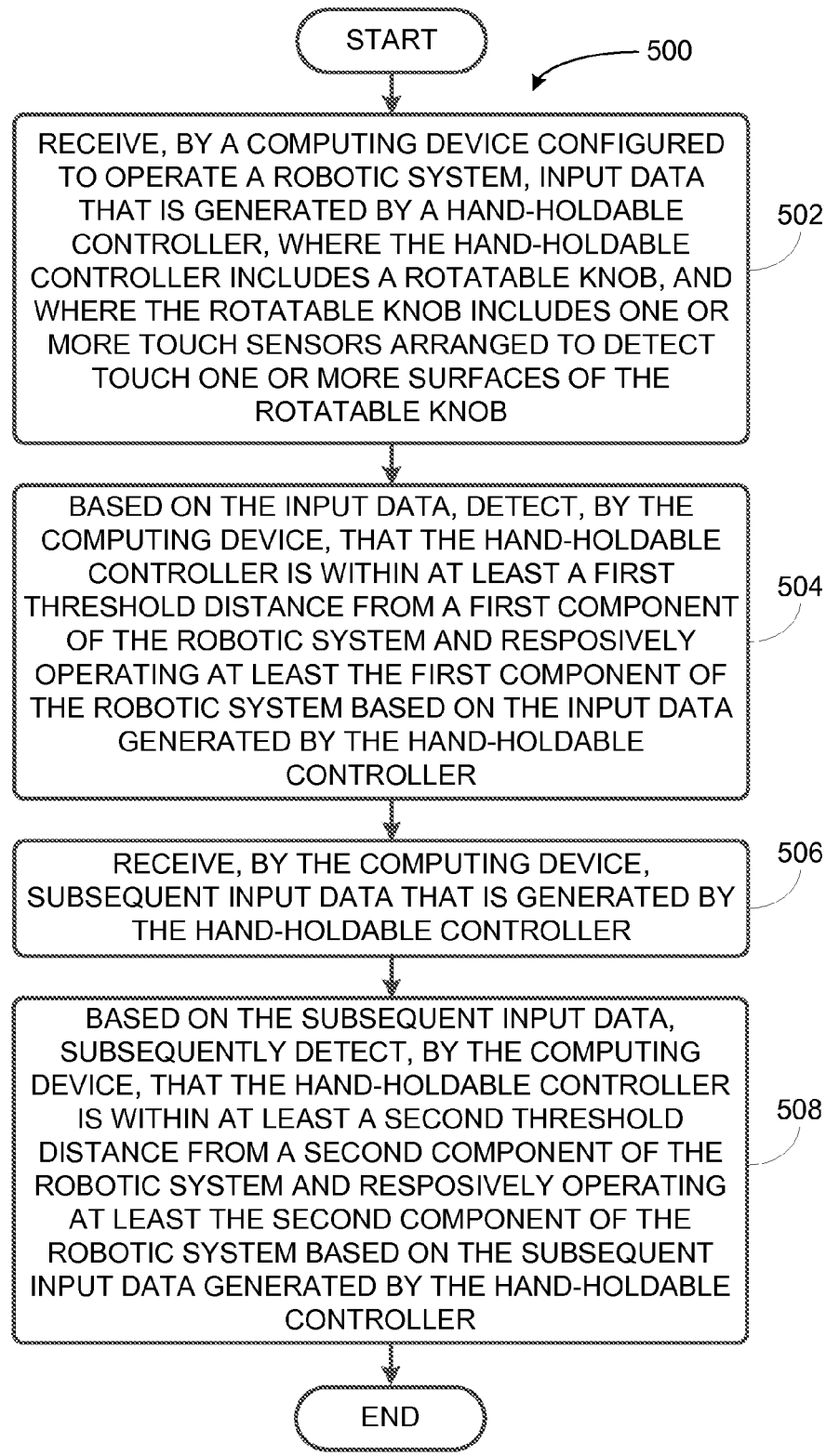
FIG. 5 is an example flowchart for proximity-based binding, according to an example implementation.

FIG. 5 is a flowchart illustrating a method 500, according to an example implementation. In particular, method 500 may be implemented to control a particular component of a robotic system based on proximity of a hand-holdable controller to the particular component.

Method 500 shown in FIG. 5 (and other processes and methods disclosed herein) presents a method that can be implemented within an arrangement involving, for example, the robotic system 100, the robotic arm 118, the computing device 200, tablet 216, hand-holdable controller 300, example hand-holdable controller 300 and/or within the arrangement 400 shown in FIG. 4 (or more particularly by one or more components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include one or more operations, functions, or actions as illustrated by one or more of blocks 502-508. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, method 500 involves receiving, by a computing device (e.g., computing device 100) configured to operate a robotic system (e.g., robotic system 200), input data that is generated by a hand-holdable controller (e.g., hand-holdable controller 300), where the hand-holdable controller comprises a rotatable knob (e.g., knob 312), and where the rotatable knob comprises one or more touch sensors (e.g., touch sensors 316) arranged to detect touch on one or more surfaces of the rotatable knob.

In an example implementation, input data may be received by computing device 200 from hand-holdable controller 300 (e.g., via communication link 402A). The input data may represent rotation of the knob 312, touch data received via touch sensors 316, and/or proximity data related to proximity of the hand-holdable controller 300 to one or more components of the robotic system 100 and/or to the computing device 200 (as further discussed below), among others. Moreover, this input data may affect one or more aspects of the computing device 200 as further discussed below. Additionally or alternatively, the computing device 200 may process and interpret this input data into one or more operations that should be carried out by one or more components of the robotic system 100. The computing device 200 may then send commands to the robotic system 100 (e.g., via communication link 402B) and the robotic system 100 may carry out these operations based on the received commands.

Various implementations may generally be discussed below in the context of the hand-holdable controller 300 providing functionality of the robotic system 100 by way of the computing device 200 interpreting input data received from the hand-holdable controller 300. However, other implementations may also be possible. For instance, the hand-holdable controller 300 may control the robotic system 100 directly (e.g., via communication link 402C). As such, any functionality of computing device 200 described herein may be incorporated within the hand-holdable controller 300. Other examples and implementations may also be possible.

In a further aspect, the received input data may be in the form of computer-readable data packets, among other possible forms. Additionally, the input data may be received continuously (e.g., in real-time) or may be received from time-to-time (e.g., periodically). Further, the computing device 200 may receive input data in several separate data packets or in a single data packet. For instance, data representing rotation of the knob 312, touch data, and/or proximity data may each be received via separate data packets or may all be received via the same data packet, among others. Once the input data is received, some or all of the input data may be stored in a data storage (e.g., data storage 204) and/or processed (e.g., using processors 202) to provide the functionality further discussed below.

At block 504, method 500 involves, based on the input data, detecting, by the computing device, that the hand-holdable controller is within at least a first threshold distance from a first component of the robotic system and responsively operating at least the first component of the robotic system based on the input data generated by the hand-holdable controller.

In an example implementation, the computing device 200 may detect that the hand-holdable controller 300 is within a threshold distance away from (e.g., threshold proximate to) a component of the robotic system 100 in various ways. In one example, wireless signal emitters may be positioned on (or in the vicinity of) various components of the robotic system 100, where different wireless signal emitters may correspond to different components. In this example, the various wireless signal emitters may each transmit signals continuously or from time-to-time. These signals may have emitter identification (ID) embedded thereon to represent the particular emitter that emits the corresponding signal.

Additionally, in this example, the hand-holdable controller 300 may have a wireless signal receiver configured to receive signals such as those emitted by the wireless signal emitters. Upon receiving a signal via the wireless signal receiver, the hand-holdable controller 300 may process the received signal to determine the particular emitter that emitted the signal using the emitter ID, thereby determining the corresponding component of the robotic system 100. Additionally or alternatively, the hand-holdable controller 300 may process the received signal to determine a distance between the wireless signal receiver and the particular wireless signal emitter. This distance may be determined, among other ways, by determining strength of the received signal and then determining a distance corresponding to the determined signal strength. Alternatively, the hand-holdable controller 300 may send information regarding the received signal to the computing device 200, where the computing device 200 then determines the particular emitter and/or the distance, among others.

After determining the distance, the hand-holdable controller 300 may determine that the distance is less than a threshold distance or may determine that the distance is more than the threshold distance. Upon this determination, the hand-holdable controller 300 may send data to the computing device 200 (e.g., directly or via the robotic system 100), where the data indicates whether or not the distance is less than the threshold distance, among other indications such as value of the determined distance etc. Alternatively, if the computing device 200 is the entity determining the distance after receiving information regarding the received signal from the hand-holdable controller 300, then the computing device 200 may carry out the determination of whether the distance is less than the threshold distance, among other determinations.

In another example, the hand-holdable controller 300 may include at least one wireless signal emitter. In this example, the wireless signal emitter may transmit signals continuously or from time-to-time. These signals may have an emitter ID embedded thereon to indicate that the emitter of the hand-holdable controller 300 emits the corresponding signal. Additionally, in this example, the robotic system 100 may have various wireless signal receivers positioned on or in the vicinity of different components of the robotic system 100, where different receivers may correspond to different components. These receivers may be configured to receive signals such as those emitted by the wireless signal emitter of the hand-holdable controller 300.

Upon receiving a signal via a wireless signal receiver, the robotic system 100 may process the received signal to determine the particular emitter that emitted the signal using the emitter ID, specifically in order to determine whether the signal was emitted by the emitter of the hand-holdable controller 300. If the robotic system 100 determines that the signal was emitted by the emitter of the hand-holdable controller 300, the robotic system 100 may process the received signal to determine a distance between the wireless signal receiver and the wireless signal emitter of the hand-holdable controller 300. In another case, the robotic system 100 may send information regarding the received signal to the computing device 200, where the computing device 200 then determines the distance, among others. In yet another case, the robotic system 100 may send information regarding the received signal to the hand-holdable controller 300, where the hand-holdable controller 300 then forwards the information to the computing device 200 or determines the distance and subsequently sends information regarding the determined distance to the computing device 200. Other cases may also be possible.

After determining the distance, one of the systems (e.g., the robotic system 100, the hand-holdable controller 300, or the computing device 200) may determine that the distance is less than a threshold distance or may determine that the distance is more than the threshold distance. If the robotic system 100 or the hand-holdable controller 300 make this determination, the respective system may send data to the computing device 200 (e.g., directly or via the other system), where the data indicates whether or not the distance is less than the threshold distance, among other indications such as value of the determined distance etc. Regardless, the computing device 200 may detect based on received input data (or may determine that) the hand-holdable controller 300 is within a threshold distance from a component of the robotic system.

Other examples for determining proximity may also be possible. For instance, any of the systems (e.g., the robotic system 100, the hand-holdable controller 300, or the computing device 200) may be configured to determine coordinates in physical space of any one of the following: the robotic system 100, various components of the robotic system 100, the hand-holdable controller 300, and the computing device 200. Using such coordinates, the corresponding systems can determine distances between the various physical entities and thus determine proximity as discussed above.

Figure 6A:
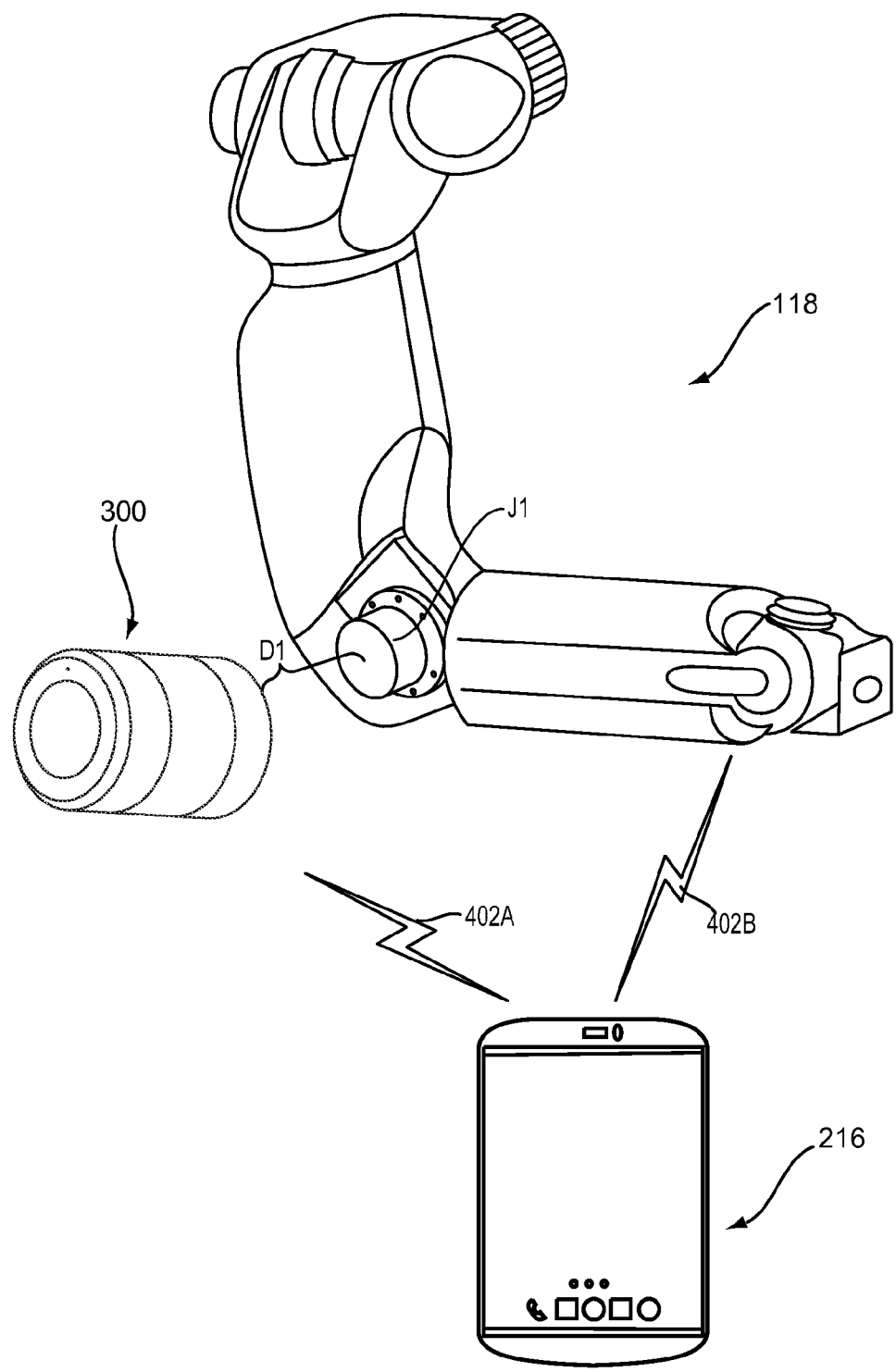
FIGS. 6A-6C illustrate example control of a first joint of a robotic arm, according to an example implementation.

To illustrate detection of proximity and subsequent operation, refer to FIG. 6A showing an arrangement where example hand-holdable controller 300 is proximate to a joint J1 of the robotic arm 118. Alternatively, the example hand-holdable controller 300 may be proximate to an actuator corresponding to the joint J1, such as an actuator configured to cause movement of one or more components (e.g., appendages) connected to the joint J1. Regardless, the example hand-holdable controller 300 is positioned at a distance D1 (e.g., 2 feet) away from the joint J1. The tablet 216 can receive information about the distance D1 (e.g., via communication link 402A) and can determine that the distance D1 is within a threshold distance (e.g., 4 feet).

In some cases, the computing device 200 may detect that the hand-holdable controller 300 is threshold proximate to multiple components of the robotic system 100 simultaneously. In such cases, the computing device 200 may choose to operate one, some, or all of these components simultaneously. Moreover, the computing device 200 may use various criteria to determine which of the multiple components to operate. In one example, the computing device 200 may determine one or more most proximate components such as by determining the shortest distance(s) from among the distances at issue.

In another example, the computing device 200 may determine an orientation of the hand-holdable controller 300 in space such as based on data received from an IMU of the hand-holdable controller 300. The computing device 200 may also receive information regarding the position in space of various components of the robotic system 100. In this example, may determine which component the hand-holdable controller 300 is directed towards based on the orientation of the hand-holdable controller 300. For instance, the computing device 200 may determine that axis 326 of knob 312 may align with a particular component of the robotic system 100 and may responsively determine that the hand-holdable controller 300 is directed towards this particular component with the intention to operate this particular component. Other instances may also be possible.

In yet another example, the computing device 200 may determine which component to operate based on orientation of the hand-holdable controller 300 being the same (or approximately the same) as the orientation of the intended components or of intended movements of the robotic system 100 in physical space. As an example, multiple actuators may correspond to the same joint in a robotic system 100 such as joint J1. Different actuators, from among these multiple actuators, may correspond to movements in different degrees of freedom. When the hand-holdable controller 300 is proximate to such a joint, the hand-holdable controller may be proximate to some or all such actuators corresponding to this joint. The orientation of the hand-holdable controller 300 when it is proximate to the joint may affect the degree of freedom in which the joint rotates. For instance, if the axis 326 of knob 312 aligns with a "pitch" axis of the joint J1, then the computing device 200 may responsively operate the actuator corresponding to the "pitch" axis. Moreover, subsequent rotation of the knob 312 may cause rotation of the joint along the "pitch" axis such as in the same direction of rotation as of knob 312. Whereas, if the axis 326 of knob 312 aligns with a "yaw" axis of the joint J1, then the computing device 200 may responsively operate the actuator corresponding to the "yaw" axis. Other examples may also be possible.

To responsively operate the component, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As further discussed below, these particular operations are based on an interpretation of the input data received by the computing device 200 from the hand-holdable controller 300.

Further, some form of feedback may be provided upon configuring the computing device 200 to operate the particular component. In one example, the computing device 200 may provide visual feedback (e.g., via display 212) indicating the particular component being controlled. In another example, the computing device 200 may send a command to the hand-holdable controller 300 to cause vibrational feedback (e.g., provided by the motor 318) such that a user holding the hand-holdable controller 300 can feel the vibration. In yet another example, visual feedback may be provided by the particular component of the robotic system 100. For instance, an LED that is coupled to the particular component may light up when the computing device 200 is set to operate the particular component. Other examples may also be possible.

In an example implementation, the input data received by the computing device 200 may be interpreted, by the computing device 200, to correspond to a particular operation of the component that is based on (i) rotation of the knob and (ii) touch data received from the touch sensors during the rotation of the knob. For instance, referring back to FIG. 6A, the tablet 216 may cause rotation of joint J1 based on rotation of the knob 312 of hand-holdable controller 300 and/or based on touch data received from touch sensors on the knob 312 during the rotation.

With regards to rotation of the knob 312, many example physical parameters related to rotation of the knob 312 can be mapped to (i) physical parameters related to rotation of the joint J1 (or specifically rotation applied by an actuator coupled the particular joint) and/or can be mapped to (ii) physical parameters related to other components. In one example, the amount of rotation of the knob 312 may correspond to an amount of rotation of the joint J1. For instance, the ratio of an amount of rotation of the knob 312 to an amount of rotation of the joint J1 may be 1:1, among other possible ratios. In this instance, half a revolution of the knob 312 may result in half a revolution of the joint J1, for example. In another example, as discussed above, rotation of the joint J1 may be in the same direction (e.g., clockwise or counterclockwise) as rotation of the knob 312. In yet another example, the velocity/acceleration of rotation of the knob 312 may correspond to velocity/acceleration of rotation of the joint J1. For instance, the ratio of velocity of rotation of the knob 312 to velocity of rotation of the joint J1 may be 2:1, among other possible ratios. In this instance, rotation of the knob 312 at 20 miles per hours (mph) may result rotation of the joint J1 at 10 mph, for example. Other examples may also be possible.

Figure 6B:
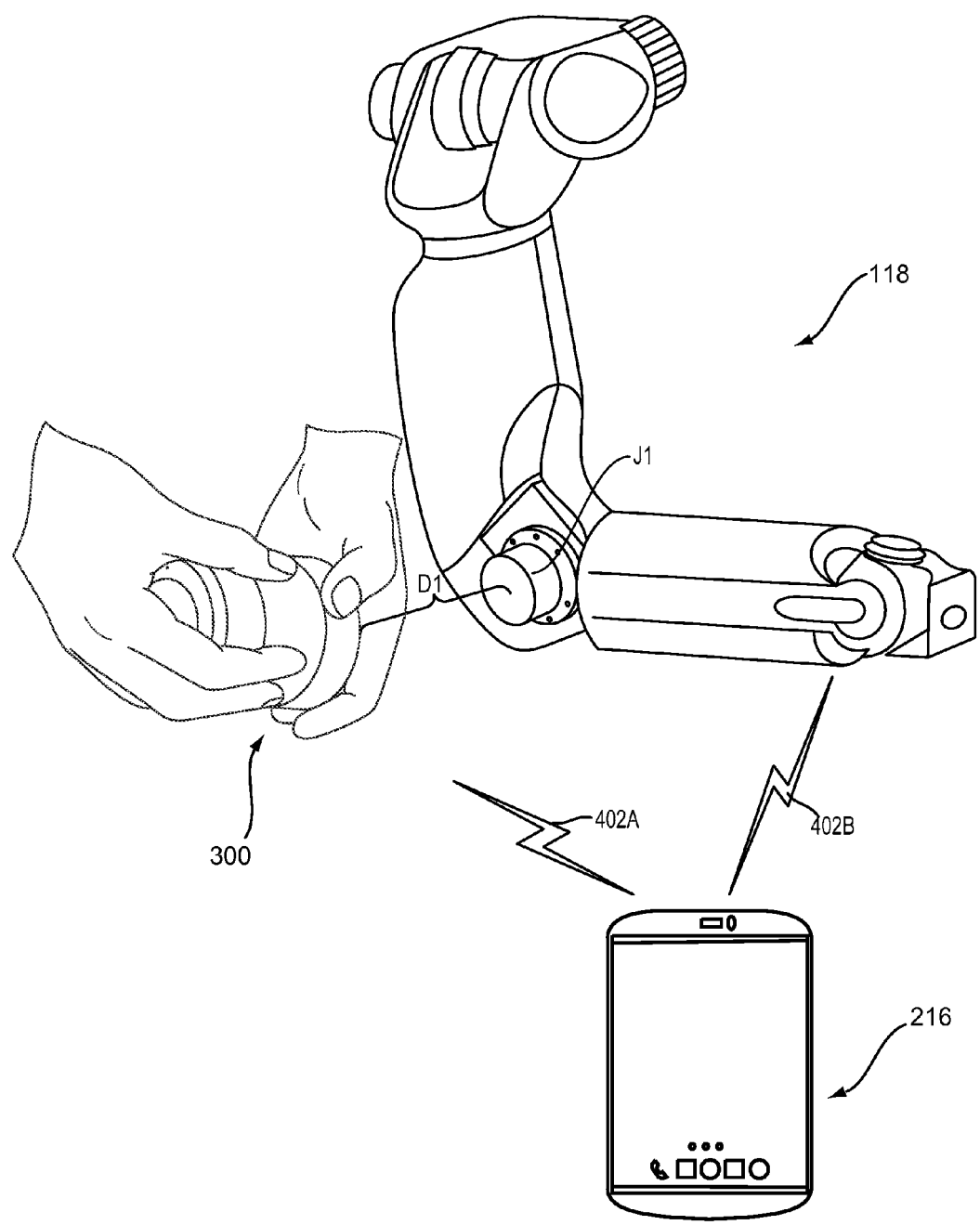
Figure 6C:
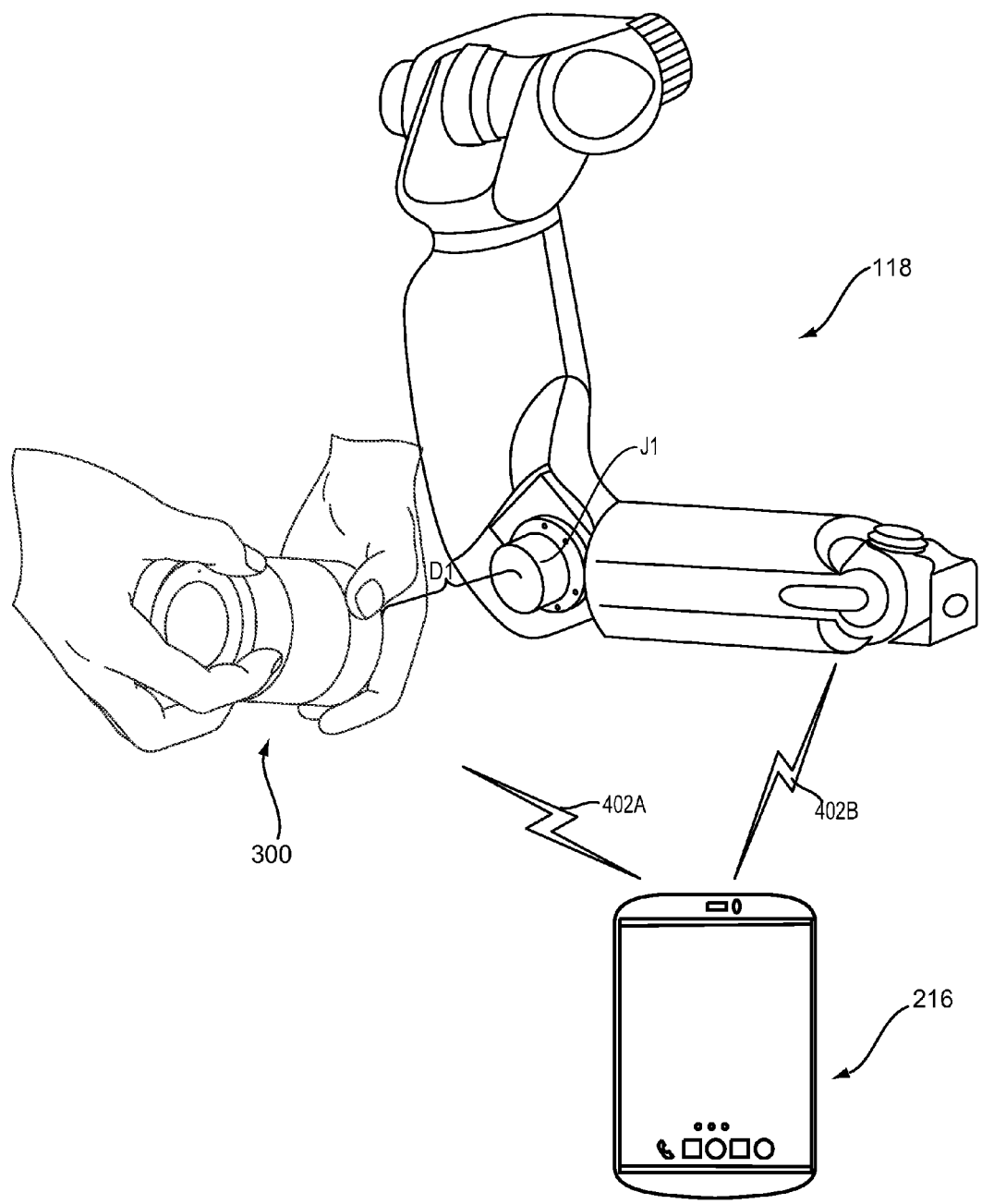

With regards to touch, the particular touch data received during rotation of the knob 312 may affect the operation of a particular component, such as affecting characteristics of rotation of the joint J1 for example. To illustrate, refer to FIG. 6B-6C showing the different touches first introduced above in association with FIGS. 3C-3D. In particular, FIG. 6B shows the "full grasp" touch while FIG. 6C shows the "fingertip grasp" touch. Note that many other examples touches are also possible without departing from the scope of the disclosure.

In one example, varying the touch data may vary the ratios discussed above with regards to rotation of the knob 312 (but may also apply to change of physical parameters related to other components). For instance, the ratio of an amount of rotation of the knob 312 to an amount of rotation of the joint J1 may be 1:1 during a "full grasp". Whereas, the ratio of an amount of rotation of the knob 312 to an amount of rotation of the joint J1 may be 2:1 during a "fingertip grasp". In another example, varying the touch data may vary granularity of rotation of the knob 312 (but may also apply to granularity of physical parameters related to other components). For instance, a "full grasp" may correspond to coarse movement (e.g., relatively large movement per degree of rotation) while a "fingertip grasp" may correspond to a fine movement (e.g., relatively small movement per degree of rotation). Other examples may also be possible.

In an example implementation, operating a particular component may involve adjusting functionality of the knob 312 of the hand-holdable controller 300 based on characteristics of the particular component (e.g., using a command sent from the computing device 200 to the hand-holdable controller 300). In one aspect, adjusting functionality of the knob 312 may involve adjusting characteristics of rotation of the knob 312 based on characteristics of the particular component. As an example, an amount of torque needed to carry out a particular rotation of the joint J1 may correspond to an amount of torque (e.g., applied by a user) needed to rotate the knob 312 in order to cause this particular rotation of the joint J1. This relationship may be in the form of a ratio such as a 4:1 ratio of an amount torque applied by the actuator to an amount of torque applied to the knob 312. For instance, half a revolution of the joint J1 at a particular velocity may require a torque of 40 Newton-Meters. In this instance, a torque of 10 Newton-Meters should be applied to the knob 312 to result in the half a revolution of the joint J1 at the particular velocity.

In this manner, a user of the hand-holdable controller 300 can essentially feel the "weight" of a joint that is being controlled. This may provide a form of feedback to the user indicating that the hand-holdable controller 300 is proximate to a component of the robotic system 100 and/or that the computing device 200 has been configured to operate the component. Moreover, different actuators corresponding to different joints (and/or different actuators corresponding to the same joint) may require application of different torques to cause a particular rotation of the respective joint. This may be based on the components (e.g., appendages) connected to the joints as some components may be heavier and may thus require more torque to be moved and vice versa.

As such, if the computing device 200 reconfigures to operate a different joint (as further discussed below), this different joint may have different characteristics and may thus affect the characteristics of rotation of the knob 312. For instance, the different joint may require more torque to result in the half a revolution discussed above. As result, the amount of torque to be applied to the knob 312, in order to result in such rotation of the different joint, may increase proportionally. In this manner, the user of the hand-holdable controller 300 can essentially feel the different "weights" of different joints as they are being controlled respectively.

Further, if a weight is added to a component that is coupled to a joint (e.g., an end effector holding an object or an external force resisting movement of an appendage etc.), characteristics of rotation of the knob 312 may update to reflect this added weight such as by requiring additional torque to be applied to rotate the knob 312. Note that other characteristics of rotation of the knob 312 may also change based on the characteristics of the particular component being controlled.

In another aspect, adjusting functionality of the knob 312 may involve adjusting characteristics of touch data based on characteristics of the particular component. As an example, while operating joint J1, the ratio of amount of rotation of the knob 312 to an amount of rotation of the joint J1 may be 1:1 during a "full grasp". However, if the computing device 200 reconfigures to operate a different joint (as further discussed below) such as joint J2, the ratio of amount of rotation of the knob 312 to an amount of rotation of the joint J2 may be 3:1 during the same "full grasp". As such, interpretation of touch data, by the computing device 200, may change depending on the particular component being controlled. To carry out such changes, the computing device 200 may, for example, refer to stored information (e.g., in data storage 204) related to characteristics of various components as well as the specific interpretations (i.e., of received input data) that should be carried out based on characteristics of a particular component, such as for the purpose of determining operation of the particular component based on the input data.

In a further aspect, the hand-holdable controller 300 may provide feedback (e.g., based on a command sent from the computing device 200 to the hand-holdable controller 300) when a limit of a particular component is exceeded (or about to be exceeded). For instance, the computing device 200 may detect that rotation of a particular joint exceeds a joint limit and may responsively cause the hand-holdable controller 300 to provide feedback such as using the knob 312 for example. Various examples of joint limits are possible.

In one example, a joint limit may be a torque limit of an actuator coupled to a particular joint. That is, the computing device 200 may detect that rotation of the knob 312, during control of the particular joint, results in a torque of the actuator reaching (or exceeding) a limit. In another example, a joint limit may be a velocity/acceleration limit of the actuator coupled to the particular joint. That is, the computing device 200 may detect that rotation of the knob 312, during control of the particular joint, results in a velocity/acceleration of the actuator reaching (or exceeding) a limit. In yet another example, a joint limit may be a power limit of the actuator coupled to the particular joint. That is, the computing device 200 may detect that rotation of the knob 312, during control of the particular joint, results in power output of the actuator reaching (or exceeding) a limit. In yet another example, a joint limit may involve restriction to rotation of the joint such as when an appendage that is coupled to the joint cannot move due to physical constraints in the environment, among other reasons. Other examples may also be possible.

Various forms of feedback can be provided to reflect such joint limits. In one example, the feedback may be vibrational feedback provided by the motor 318. The extent of the vibrational feedback may be based on an extent that a limit is exceeded and/or an extent that the limit is close to being exceeded, among others. In another example, the feedback may be in the form of resistance to rotation of the knob 312, such as a torque provided by the motor 318 to counteract rotation of the knob 312. For instance, if restriction to rotation of a joint is detected, the motor 318 may apply a counteracting torque to restrict any further rotation of the knob in the direction corresponding to the direction at which there is restriction to rotation of the joint. Other examples may also be possible.

At block 506, method 500 involves receiving, by the computing device, subsequent input data that is generated by the hand-holdable controller. This subsequent input data may be in the same form as the input data discussed above. Moreover, this subsequent input data may represent movement of the hand-holdable controller 300 and/or updated proximity information related to proximity of the hand-holdable controller 300 to other components, among other possibilities.

At block 508, method 500 involves, based on the subsequent input data, subsequently detecting, by the computing device, that the hand-holdable controller is within at least a second threshold distance from a second component of the robotic system and responsively operating at least the second component of the robotic system based on the subsequent input data generated by the hand-holdable controller.

In an example implementation, the computing device 200 may detect when the hand-holdable controller 300 is threshold proximate to a second (i.e., different) component of the robotic system 100. During such detection, the hand-holdable controller 300 may still be threshold proximate to the first component or may no longer be threshold proximate to the first component. If the hand-holdable controller 300 is still threshold proximate to the first component, the computing device 200 may use the techniques discussed above to determine the appropriate component to operate. Alternatively, the computing device 200 may reconfigure to operate both the first and second components.

Whereas, if the hand-holdable controller 300 is no longer threshold proximate to the first component, the computing device 200 may cease operation of the first component and may reconfigure to operate the second component. Alternatively, the computing device 200 may reconfigure to operate both the first and second components (e.g., based on user-input indicating so). In other cases, the computing device 200 may cease operation of the first component (and may then reconfigure to operate the second component) in response to detecting threshold proximity of the hand-holdable controller 300 to the second component, such as without consideration of remaining proximity to the first component. Other cases may also be possible.

Figure 7:
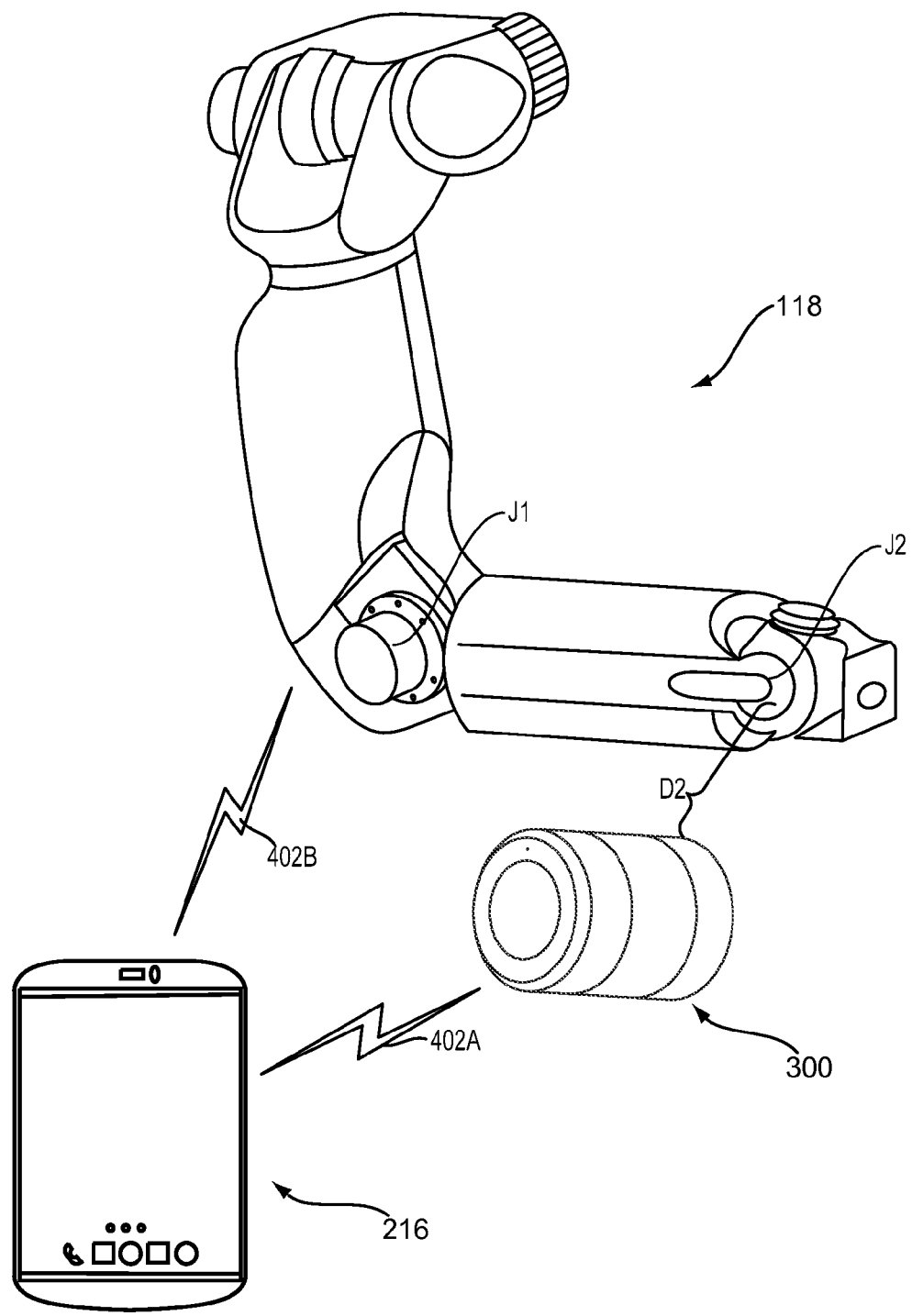
FIG. 7 illustrates example control of a second joint of the robotic arm, according to an example implementation.

To illustrate detection of proximity to a second component and subsequent operation of the second component, refer to FIG. 7 showing an arrangement where example hand-holdable controller 300 is proximate to a joint J2 of the robotic arm 118. Alternatively, the example hand-holdable controller 300 may be proximate to an actuator corresponding to the joint J2, such as an actuator configured to cause movement of one or more components (e.g., appendages) connected to the joint J2. Regardless, the example hand-holdable controller 300 is positioned at a distance D2 (e.g., 3 feet) away from the joint J2. The tablet 216 can receive information about the distance D2 (e.g., via communication link 402A) and can determine that the distance D2 is within a threshold distance (e.g., 5 feet).

In an example implementation, threshold distances corresponding to various components may be the same as each other or may be different from each other. For instance, the threshold distance discussed above in relation to joint J1 is 4 feet while the threshold distance discussed above in relation to joint J2 is 5 feet. Arranging the system to have different corresponding threshold distances for different components may be particularly advantageous as various components can vary in sizes and/or shapes. For instance, an example arrangement may involve smaller components having smaller corresponding threshold distances relative to threshold distances that correspond to relatively larger components. Such an arrangement may help avoid difficulties in discerning which component the user actually intends to control. Other example arrangements may also be possible.

To responsively operate the second component, the computing device 200 may exchange messages with the robotic system 100 (e.g., via communication link 402B). As noted above, the messages may include commands that indicate the particular component to which the robotic system 100 should send control signals. The messages may also include commands that indicate the particular operations that should be carried out by the second component. These particular operations are based on an interpretation of the input data received by the computing device 200 from the hand-holdable controller 300.

More specifically, the subsequent input data may correspond to an operation of the second component that is based on (i) subsequent rotation of the knob 312 and (ii) subsequent touch data received during the subsequent rotation. When the hand-holdable controller 300 is threshold proximate to the second component, the computing device 200 may change interpretation of received input data based on characteristics of the second component as discussed above. For example, when example hand-holdable controller 300 is threshold proximate to joint J1, the ratio of an amount of rotation of the knob 312 to an amount of rotation of the joint J1 may be 1:1. Whereas, when example hand-holdable controller 300 is threshold proximate to joint J2, the ratio of an amount of rotation of the knob 312 to an amount of rotation of the joint J2 may be 1:2. As such, the same amount of rotation of the knob 312 may affect rotation of different joints in a different manner (but in some cases may also affect different joints in the same manner). Other examples may also be possible.

In a further aspect, the computing device 200 may detect that the hand-holdable controller 300 is a threshold distance away from a particular component while operating the particular component. This particular component may be the first or second components discussed above, among other possible components. Moreover, this threshold distance may be the same as (or may be different than) the threshold distance used for threshold proximity. Regardless, the computing device 200 may cease operation of the particular component in response to making such as detection. Alternatively, the computing device 200 may continue operating the particular component regardless of the distance between the hand-holdable controller 300 and the particular component. Note, however, that continuing operation of the particular component in this manner may be subject to constraints of various communication links and/or subject to the various systems being powered-on or powered-off, among other considerations.

In the case that the computing device 200 detects a power-off event of a system such as the hand-holdable controller 300, the computing device 200 may store information related to a most recent configuration. For instance, if the computing device 200 operates a particular joint at the time of a power-off event, the computing device 200 may store information related to the fact that this particular joint was the most recent component operated prior to the power-off event and/or may store information related to characteristics of the particular joint, such as position of the particular joint for example. Subsequently, the computing device 200 can detect a power-on event of a system such as the hand-holdable controller 300. Upon such detection, the computing device 200 may reconfigure to operate using the most recent configuration. For instance, the computing device 200 may reconfigure to operate the particular joint which was the most recent component operated prior to the power-off event. Other instances may also be possible.

VI. Additional Features

In an example implementation, the computing device 200 can detect that the hand-holdable controller 300 is within a threshold distance from the computing device 200. To do so, the computing device 200 can using any of the proximity detection techniques discussed above, such as the use of wireless signal transmitters and emitters for instance. Upon detecting that the hand-holdable controller 300 is within a threshold distance from the computing device 200, the computing device 200 can arrange the hand-holdable controller 300 to operate at least one aspect of the computing device 200.

To carry out this arrangement, the computing device 200 may exchange messages with the hand-holdable controller 300 (e.g., via communication link 402A). The messages may include commands that indicate the particular aspects (e.g., a display or a GUI etc.) of the computing device 200 to which the computing device 200 should send control signals. The messages may also include commands that indicate the particular operations that should be carried out by the particular aspects of the computing device 200. These particular operations are based on an interpretation of the input data received by the computing device 200 from the hand-holdable controller 300.

Figure 8A:
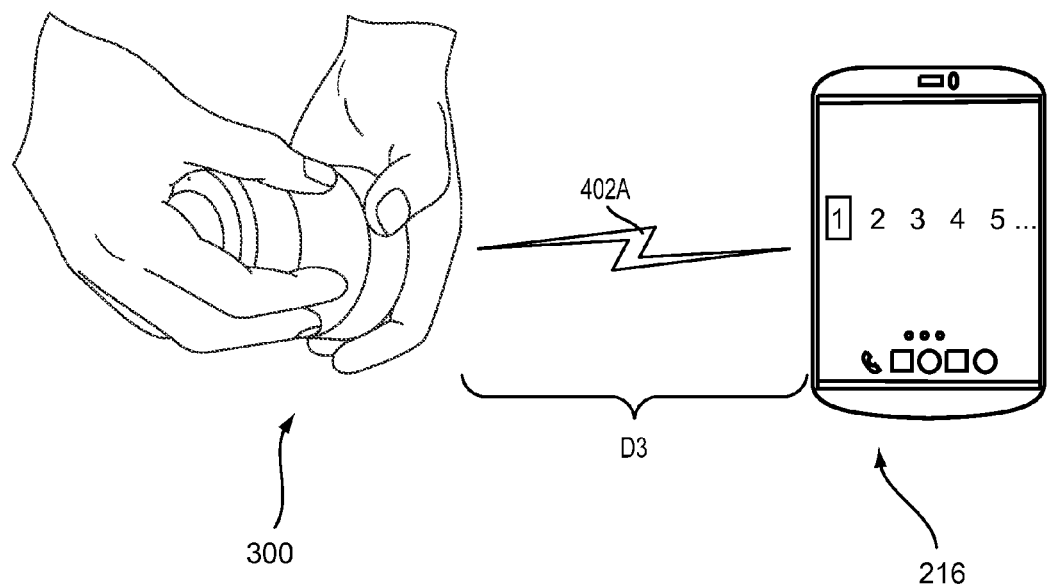
FIGS. 8A-8B illustrate example control of the computing device, according to an example implementation.
Figure 8B:
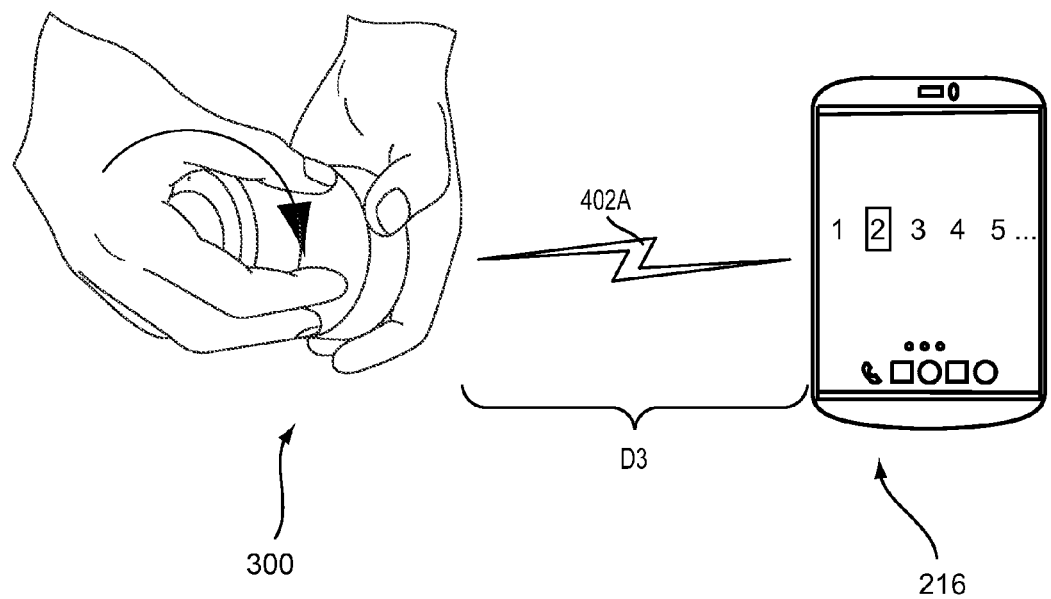

To illustrate, refer to FIGS. 8A-8B showing example control of tablet 216 by the example hand-holdable controller 300. As shown, the example hand-holdable controller 300 is at a distance D3 away from the tablet 216. Upon detecting that the distance D3 is within a threshold distance, the tablet 216 may exchange messages with the example hand-holdable controller 300 to allow the example hand-holdable controller 300 to control a particular aspect of the tablet 216, where the particular aspect may be selectable by the user. Selection of the particular aspect may be done via touch gestures on the knob 312, threshold proximity to the particular aspect, and/or via touch-input at the tablet, among other possibilities. Additionally, FIG. 8A depicts a series of numbers (e.g., "1 2 3 4 5 . . . ") displayed by a GUI of the tablet 216, where the number "1" is shown as selected.

As shown in FIG. 8B, rotation of the knob 312 results in transition from a state where the number "1" is selected to a state where the number "2" is selected. Further rotation of the knob 312 in the same direction may result in transition from a state where the number "2" is selected to a state where the number "3" is selected and so on. Whereas, rotation of the knob 312 in the opposite direction may result in transition from a state where the number "2" is selected back to a state where the number "1" is selected and so on.

During such transitions, feedback may be provided such as via the knob 312 of the example hand-holdable controller 300. In one example, vibrational feedback may be provided by the motor during or after each such transition. In another example, the motor may be operated to vary the force that is required from the user to rotate the knob 312 such as providing ticks or detents during rotation of the knob when such transitions take place. Other examples may also be possible. Note that other controllable aspects of the computing device 200 (e.g., using the hand-holdable controller 300) may involve: transitions between screens of a GUI, selection of items on a GUI, power-on and power-off control, and/or selection of components of the robotic system 100 to be controlled, among others.

In a further aspect, the computing device 200 can receive user-input (e.g., touch-input at the display 218 of the tablet 216) corresponding to selection of a feature (e.g., component) of the robotic system 100 to be operated by the hand-holdable controller 300 (e.g., operated via interpretation of input data by the computing device 200). Responsively, the computing device 200 may cause the hand-holdable controller 300 to operate the selected feature via operation of a particular aspect of the computing device 200. For example, when the example hand-holdable controller 300 is configured to operate an aspect of the tablet 216 such as a GUI, touch-input may be received at the display 218 of the tablet 216. This touch-input may correspond to selection of a particular robotic arm 118 component (e.g., selection using a "drag and drop" selection icon). Selection of the particular component may be from a list of components displayed by a GUI or a model of the robotic arm 118 displayed by a GUI, among other possibilities.

In yet a further aspect, such selection via the computing device 200 may also be used for selecting between (i) control by the hand-holdable controller 300 of the computing device 200 (e.g., particular aspects of the tablet 216) and (ii) control by the hand-holdable controller 300 of the robotic system 100 (e.g., via the computing device 200). Additionally, such selection may also allow for varying functionality of the hand-holdable controller 300. For instance, user-input at the computing device 200 may change functionality of the motor such that rotation of the knob 312 can change between "free spin" and providing "ticks" during rotation as discussed above. Further, such selection may also allow for varying interpretation of input data received from the hand-holdable controller 300. For instance, user-input at the computing device 200 may change the ratios discussed above in relation to the various joints of the robotic system 100. Other instances may also be possible.

While control of the robotic system 100 was discussed above generally in the context of controlling joints of the robotic system 100, such discussion should not be seen as limiting as the example implementations discussed herein may be used for control of a variety of different robotic system 100 components, as well as components/aspects of other devices and machines. In one example, rotation of the knob 312 may allow for control of volume output of a speaker (e.g., a speaker incorporated within the robotic system 100). In another example, rotation of the knob 312 may allow for control of light output from a light source (e.g., a light source incorporated within the robotic system 100). In yet another example, rotation of the knob 312 may allow for control of movement/functionality of an end effector of the robotic system 100. Other examples may also be possible.

V. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method comprising:
   receiving, by a computing device configured to operate a robotic system, input data that is generated by a hand-holdable controller, wherein the hand-holdable controller comprises a rotatable knob, and wherein the rotatable knob comprises one or more touch sensors arranged to detect touch on one or more surfaces of the rotatable knob;
   based on the input data, detecting, by the computing device, that the hand-holdable controller is within at least a first threshold distance from a first component of the robotic system and responsively (i) operating at least the first component of the robotic system based on the input data generated by the hand-holdable controller and (ii) causing the hand-holdable controller to adjust characteristics of rotation of the rotatable knob based on the first component;
   receiving, by the computing device, subsequent input data that is generated by the hand-holdable controller; and
   based on the subsequent input data, subsequently detecting, by the computing device, that the hand-holdable controller is within at least a second threshold distance from a second component of the robotic system and responsively (i) operating at least the second component of the robotic system based on the subsequent input data generated by the hand-holdable controller and (ii) causing the hand-holdable controller to adjust characteristics of rotation of the rotatable knob based on the second component.

2. The method of claim 1, further comprising:
   further in response to subsequently detecting that the hand-holdable controller is within at least a second threshold distance from a second component of the robotic system, ceasing operation of at least the first component of the robotic system.

3. The method of claim 1, further comprising:
   subsequently detecting that the hand-holdable controller is at least a third threshold distance away from the second component and responsively ceasing operation of at least the second component of the robotic system.

4. The method of claim 1,
   wherein the hand-holdable controller further comprises a motor configured to apply torques to the rotatable knob,
   wherein causing the hand-holdable controller to adjust characteristics of rotation of the rotatable knob based on the first component comprises causing the motor to apply torques to the rotatable knob in accordance with a first operational mode selected based on the first component, and
   wherein causing the hand-holdable controller to adjust characteristics of rotation of the rotatable knob based on the second component comprises causing the motor to apply torques to the rotatable knob in accordance with a second operational mode selected based on the second component.

5. The method of claim 4,
   wherein applying torques to the rotatable knob in accordance with the first operational mode comprises applying torques to the rotatable knob in accordance with a first torque profile arranged to represent characteristics of the first component, and
   wherein applying torques to the rotatable knob in accordance with the second operational mode comprises applying torques to the rotatable knob in accordance with a second torque profile arranged to represent characteristics of the second component.

6. The method of claim 5,
   wherein applying torques to the rotatable knob in accordance with the first torque profile comprises applying first torques to the rotatable knob based on first external forces applied to cause rotation of the rotatable knob, and
   wherein applying torques to the rotatable knob in accordance with the second torque profile comprises applying second torques to the rotatable knob based on second external forces applied to cause rotation of the rotatable knob.

7. The method of claim 1, wherein the input data corresponds to at least one particular operation of the first component that is based on (i) a first rotation of the rotatable knob and (ii) touch data received from the one or more touch sensors during the first rotation, and wherein operating at least the first component of the robotic system based on the input data comprises sending a first command, to the robotic system, that instructs the robotic system to carry out the at least one particular operation of the first component.

8. The method of claim 7, wherein the subsequent input data corresponds to at least one particular operation of the second component that is based on (i) a second rotation of the rotatable knob and (ii) touch data received from the one or more touch sensors during the second rotation, and wherein operating at least the second component of the robotic system based on the subsequent input data comprises sending a second command, to the robotic system, that instructs the robotic system to carry out the at least one particular operation of the second component.

9. The method of claim 1,
   wherein the first component comprises a first actuator corresponding to a first joint of the robotic system,
   wherein operating at least the first component of the robotic system comprises operating the first actuator to rotate the first joint (i) based on a first rotation of the rotatable knob while the hand-holdable controller is within at least the first threshold distance from the first actuator and (ii) based on touch data received from the one or more touch sensors during the first rotation of the rotatable knob, wherein the second component comprises a second actuator corresponding to a second joint of the robotic system, and wherein operating at least the second component of the robotic system comprises operating the first actuator to rotate the second joint (i) based on a second rotation of the rotatable knob while the hand-holdable controller is within at least the second threshold distance from the second actuator and (ii) based on touch data received from the one or more touch sensors during the second rotation of the rotatable knob.

10. A non-transitory computer readable medium having stored therein instructions executable by one or more processors to cause a computing device to perform functions, wherein the computing device is configured to operate a robotic system, the functions comprising:

receiving input data that is generated by a hand-holdable controller, wherein the hand-holdable controller comprises a rotatable knob, and wherein the rotatable knob comprises one or more touch sensors arranged to detect touch on one or more surfaces of the rotatable knob;

based on the input data, detecting that the hand-holdable controller is within at least a first threshold distance from a first component of the robotic system and responsively (i) operating at least the first component of the robotic system based on the input data generated by the hand-holdable controller and (ii) causing the hand-holdable controller to adjust characteristics of rotation of the rotatable knob based on the first component;

receiving subsequent input data that is generated by the hand-holdable controller; and based on the subsequent input data, subsequently detecting that the hand-holdable controller is within at least a second threshold distance from a second component of the robotic system and responsively (i) operating at least the second component of the robotic system based on the subsequent input data generated by the hand-holdable controller and (ii) causing the hand-holdable controller to adjust characteristics of rotation of the rotatable knob based on the second component.

11. The non-transitory computer readable medium of claim 10, wherein the hand-holdable controller further comprises a motor configured to apply torques to the rotatable knob, wherein causing the hand-holdable controller to adjust characteristics of rotation of the rotatable knob based on the first component comprises causing the motor to apply torques to the rotatable knob in accordance with a first torque profile arranged to represent characteristics of the first component, and wherein causing the hand-holdable controller to adjust characteristics of rotation of the rotatable knob based on the second component comprises causing the motor to apply torques to the rotatable knob in accordance with a second torque profile arranged to represent characteristics of the second component.

12. The non-transitory computer readable medium of claim 10, the functions further comprising:

subsequently detecting that the hand-holdable controller is within at least a third threshold distance from the computing device; and in response to subsequently detecting that the hand-holdable controller is within at least a third threshold distance from the computing device, arranging the hand-holdable controller to operate at least one aspect of the computing device.

13. The non-transitory computer readable medium of claim 12, the functions further comprising:

receiving user-input corresponding to selection of a feature of the robotic system to be operated by the hand-holdable controller and responsively causing the hand-holdable controller to operate the selected feature of the robotic system via operation of the at least one aspect of the computing device.

14. The non-transitory computer readable medium of claim 10, the functions further comprising:

detecting a power-off event of the hand-holdable controller and responsively storing information related to a most recent configuration, wherein the most recent configuration corresponds to operation of at least the second component of the robotic system; and subsequently detecting a power-on event of the hand-holdable controller and responsively operating using the most recent configuration.

15. A hand-holdable-controller system comprising:
a rotatable knob;
at least one motor that is operable to apply torque to the rotatable knob;
one or more touch sensors arranged to detect touch on one or more surfaces of the rotatable knob;
one or more processors;
a non-transitory computer readable medium; and
program instructions stored on the non-transitory computer readable medium and executable by the one or more processors to:
detect that the hand-holdable-controller system is within at least a first threshold distance from a first component of a robotic system and responsively configure the hand-holdable-controller system to (i) operate at least the first component of the robotic system and (ii) adjust characteristics of rotation of the rotatable knob based on the first component; and
subsequently detect that the hand-holdable-controller system is within at least a second threshold distance from a second component of the robotic system and responsively configure the hand-holdable-controller system to (i) operate at least the second component of the robotic system and (ii) adjust characteristics of rotation of the rotatable knob based on the second component.

16. The hand-holdable-controller system of claim 15, wherein adjusting characteristics of rotation of the rotatable knob based on the first component comprises causing the motor to apply torques to the rotatable knob in accordance with a first torque profile arranged to represent characteristics of the first component, and wherein adjusting characteristics of rotation of the rotatable knob based on the second component comprises causing the motor to apply torques to the rotatable knob in accordance with a second torque profile arranged to represent characteristics of the second component.

17. The hand-holdable-controller system of claim 15, wherein the first component comprises a first actuator corresponding to a first joint of the robotic system, wherein configuring the hand-holdable-controller system to operate at least the first component results in rotation of the first joint based on rotation of the rotatable knob while the hand-holdable-controller system is within at least the first threshold distance from the first actuator,
wherein the second component comprises a second actuator corresponding to a second joint of the robotic system, and
wherein configuring the hand-holdable-controller system to operate at least the second component results in rotation of the second joint based on rotation of the rotatable knob while the hand-holdable-controller system is within at least the second threshold distance from the second actuator.

18. The hand-holdable-controller system of claim 17, further comprising program instructions stored on the non-transitory computer readable medium and executable by the one or more processors to:
   while the hand-holdable-controller system is within at least the first threshold distance from the first actuator, detect that the rotation of the first joint exceeds a first joint limit of the first joint by at least a first threshold amount and responsively provide first feedback using at least the motor; and
   while the hand-holdable-controller system is within at least the second threshold distance from the second actuator, detect that the rotation of the second joint exceeds a second joint limit of the second joint by at least a second threshold amount and responsively provide second feedback using at least the motor.

19. The hand-holdable-controller system of claim 18,
wherein the first joint limit comprises one or more of: (i) a first torque limit, (ii) a first velocity limit, (iii) a first acceleration limit, (iv) a first power limit, (v) entry of the robotic system to a non-permissible zone while the hand-holdable-controller system is configured to operate at least the first component, and (vi) a restriction to the rotation of the first joint, and
wherein the second joint limit comprises one or more of: (i) a second torque limit, (ii) a second velocity limit, (iii) a second acceleration limit, (iv) a second power limit, (v) entry of the robotic system to a non-permissible zone while the hand-holdable-controller system is configured to operate at least the second component, and (vi) a restriction to the rotation of the second joint.

20. The hand-holdable-controller system of claim 18,
wherein the first feedback comprises one or more of: (i) first vibrational feedback provided by the motor; (ii) first resistance, provided by the motor, to rotation of the rotatable knob; and (iii) first rotational feedback provided by the motor by applying torque to the rotatable knob, and
wherein the second feedback comprises one or more of: (i) second vibrational feedback provided by the motor; (ii) second resistance, provided by the motor, to rotation of the rotatable knob; and (iii) second rotational feedback provided by the motor by applying torque to the rotatable knob.

* * * * *